United States Patent [19]

Kyles

[11] 4,303,827
[45] Dec. 1, 1981

[54] HEATING APPLIANCE AND THERMOSTAT MOUNT

[75] Inventor: Bruce W. Kyles, Asheboro, N.C.

[73] Assignee: General Electric Company, New York, N.Y.

[21] Appl. No.: 83,356

[22] Filed: Oct. 10, 1979

[51] Int. Cl.³ .............................................. H05B 1/02
[52] U.S. Cl. .................................... 219/512; 99/281; 99/288; 219/253; 219/283; 219/302; 219/308; 219/328; 219/441; 219/449; 236/DIG. 6; 236/DIG. 12; 337/377; 337/380; 337/417
[58] Field of Search ............... 219/328, 253, 302, 251, 219/308, 283, 441, 442, 436, 438, 449, 510, 512; 337/380, 381, 377, 417; 99/281, 288; 236/DIG. 6, DIG. 12

[56] References Cited

U.S. PATENT DOCUMENTS

| | | | |
|---|---|---|---|
| 2,834,868 | 5/1958 | Greene et al. | 337/381 X |
| 2,856,508 | 10/1958 | Kueser | 337/381 X |
| 3,097,289 | 7/1963 | Clark | 219/442 X |
| 3,284,599 | 11/1966 | Mertler | 337/381 X |
| 3,369,105 | 2/1968 | Wheeler | 99/281 X |
| 3,678,246 | 7/1972 | Blachly et al. | 99/281 X |
| 3,869,968 | 3/1975 | Ihlenfeld | 99/280 |
| 3,883,717 | 5/1975 | Del Percio | 337/380 X |
| 4,147,925 | 4/1979 | Belinkoff | 99/281 X |

FOREIGN PATENT DOCUMENTS 2500287 7/1976 Fed. Rep. of Germany ...... 219/302

Primary Examiner—A. Bartis
Attorney, Agent, or Firm—John F. Cullen; George R. Powers; Leonard J. Platt

[57] ABSTRACT

An electric heating appliance such as a coffeemaker, has a metallic base with an upper exposed surface and an electric heater on its lower side for heating the surface by conduction. A thermostat comprising a plastic-walled packaged unit with an opening through which an internal bimetal sensor is exposed is provided for controlling the heater and is mounted in a depressed niche formed in the surface of the heater. A detachable U-shaped metallic cover covers the opening and includes a heat-conducting projection extending through the opening very closely adjacent the sensor. The thermostat is positioned so that the cover faces and abuts the surface of the niche and a flexible clamp secures the thermostat in the niche and biases the projection and sensor closely together for fast thermostat response. The base may be an aluminum casting with the heater comprising a cast-in circular sheathed electric heating element. The thermostat is supported so that substantially all of the heat conduction from the heater to the sensor is direct and only through the projection.

5 Claims, 5 Drawing Figures

U.S. Patent
Dec. 1, 1981
4,303,827
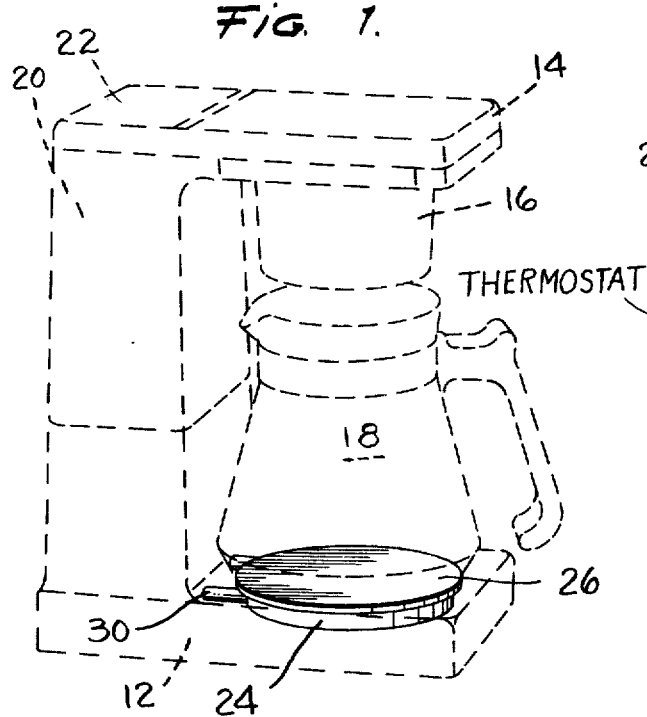
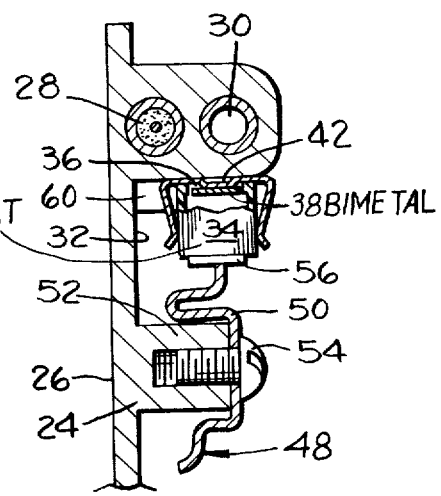
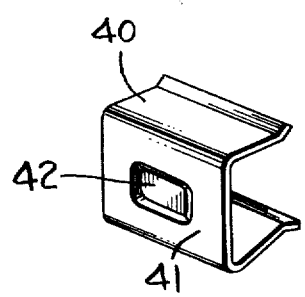
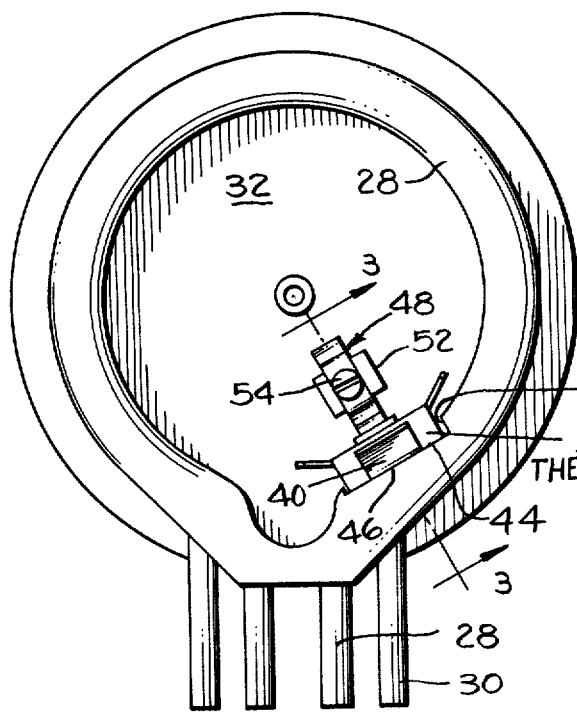
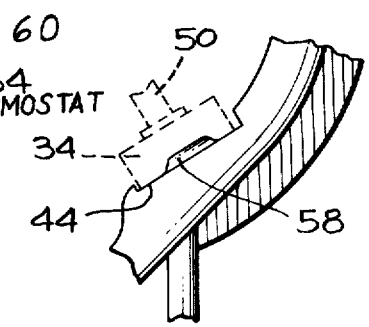

HEATING APPLIANCE AND THERMOSTAT MOUNT

BACKGROUND OF THE INVENTION

1. Field of the Invention

The invention pertains to liquid heating electrical appliance, particularly to a coffeemaker of the drip type wherein water is heated within a housing and pumped to a spreader to discharge into a supported carafe. The coffeemaker housing may support a basket filter assembly or a separate assembly may be supported directly on the carafe with the hot water dripping through the coffee to produce brewed coffee in the carafe in the conventional manner. The present invention is directed to an improved thermostat mount assembly that provides for fast thermostat response for accurate heating of the base of the electrical appliance.

2. Description of the Prior Art

In electrical appliances, particularly drip coffeemakers, there is provided a basket and filter assembly that performs efficiently at maximum capacity. Generally, they provide a heated metallic base on which the carafe rests and which is controlled by a thermostat below the base to sense the base temperature and control it for a "keeps warm" function of the brewed coffee. Various thermostats have been used to touch the base in one form or another and sense its temperature and control accordingly. A typical thermostat is a disc snap action thermostat which rests directly against the base or may contact along the side of the base in the area of the heater, to sense the base temperature and function accordingly. The disc-type thermostat is quite commonly used in such electrical appliances and particularly in coffeemakers. Improved thermostats of elongated plastic packaged bimetals have become available at lower cost and generally involve a sealed sensor element within the package which element senses heat through an opening in one of the package walls. It is customarily mounted against the appliance wall in the heated area or pressed against the base where the temperature is sensed through the opening to activate the internal bimetal and make and break the circuit in a standard manner.

These lower cost plastic enclosed thermostats operate well but tests have shown that the reaction time is unsatisfactory and it is desired that these cheaper and more compact thermostats be modified to provide a faster reaction time and thus more satisfactory operation of the controlling electrical circuit especially in the "keeps warm" feature in the heated base of drip coffeemakers. The present invention is directed to such an improvement and is not limited to coffeemakers but is applicable to any heating appliance. It is especially appropriate to the use of the well known drip coffeemaker and will be described in connection therewith. A thermostat mounting provides a "finger" or projection that reaches in to the thermostat through its side wall opening for very close positioning with the bimetal thereby providing substantially reduced reaction time and consequent control of the electric heating circuit.

SUMMARY OF THE INVENTION

In accordance with the invention, a liquid heating appliance has a base with an upper exposed surface and suitable means on the opposite side to heat the surface by conduction. Thermostat means controls the temperature of the heated surface and the thermostat is a plastic walled packaged unit with an opening through the wall to an internal sensor, the thermostat being adapted for abutment mounting directly against the heating means. In this general arrangement, an improvement in the thermostat mounting is provided comprising a depressed niche in the heating means adapted to nest the thermostat. A heat-conducting projection is disposed between the depressed niche and thermostat and the projection extends into the opening very closely adjacent the sensor. This projection may be formed directly on the heating means or, may be formed on a separate U-shaped cover that is snapped on the box thermostat, both arrangements providing the contacting projection very close to the internal sensor. In either arrangement a flexible clamp means is disposed to secure the thermostat in the niche and bias the projection and sensor close together for fast thermostat response. Suitable support ribs may be provided to support the thermostat off the base so that the entire heat conduction is through the matching projection-thermostat-wall-opening for rapid response to the heat conducted substantially only through the projection. Thus, the main object is to provide a combination liquid heating appliance with an improved thermostat mounting assembly that uses the common packaged box-shaped plastic thermostat to provide improved and rapid thermostat response for controlling the base temperature of the appliance.

BRIEF DESCRIPTION OF THE DRAWING

FIG. 1 is a perspective phantom view of a drip coffeemaker that may use the invention;

FIG. 2 is an enlarged bottom view of the base with the thermostat installed;

FIG. 3 is a cross-sectional view on line 3—3 of FIG. 2;

FIG. 4 is a perspective of a cover clamp; and

FIG. 5 is a partial cross-section of a modification with the thermostat indicated in broken lines.

DESCRIPTION OF THE PREFERRED EMBODIMENT

Referring to FIG. 1, there is shown a typical plastic coffeemaker of the common variety of from two to ten cups that is generally appropriate to the invention herein but may be applied to any electric appliance requiring a thermostat controlled heated base. However, it is especially applicable to a coffeemaker and is so described. The coffeemaker includes a molded plastic housing of a generally C-shape with a lower horizontal leg 12 forming a heating carafe support and an upper horizontal leg 14 containing a water spreader to feed heated water into a coffee containing basket 16 supported either on the coffeemaker as shown or directly on a carafe 18 in conventional fashion. The third portion or vertical leg 20 of the housing encloses a water reservoir in the upper portion which is accessible by removable lid 22 through which cold water is poured into the reservoir to start the coffee making operation when the unit is energized. Coffee is brewed by dripping hot water through basket 16 which contains a standard known filter holding coffee in the quantity desired for the number of cups being brewed. Water passes through the coffee and into lower carafe 18 as brewed coffee. A conventional base 24 usually consists of an aluminum casting with an upper exposed supporting surface 26 provided to support the carafe and such base is heated to keep the coffee warm after it has been brewed. Conventionally, the opposite side of base 26 has means for heating the base and this generally takes the form of a cast-in circular sheathed heating element 28 that may be separately welded to the underside of the base or preferably is directly cast therein as shown in FIG. 3. It is also customary to heat the water for brewing the coffee in upper leg 14 by having a contiguous or adjacent water tube 30. The structure thus far described is standard and well known in the art.

Conventionally, the underside 32 of base 24 has a thermostat means in some form that senses the temperature of the base and controls it accordingly. The thermostat generally includes a disc snap-action thermostat of known construction which may press against the bottom 32 either directly, in a recessed portion, or may press against the side of the welding or casting heater 28 all forms sensing the temperature of the base area and reacting accordingly.

Lower cost plastic enclosed thermostats in the general form of an elongated box 34 are available and these generally provide a window opening 36 in one of the walls which opening communicates directly to an internal heat-sensing bimetal 38 which responds in conventional fashion to make and break the controlled circuit in response to temperature changes. Generally such thermostats are merely placed flat against the heated surface so the internal sensor 38 is removed by a distance, albeit small, from the actual surface that is being sensed. Tests have indicated that such thermostat has a reaction time that is unsatisfactory by having a delay.

In accordance with the invention, to improve the reaction time, a thermostat cover 40 has been designed in the form of an elongated U-shaped clamp as seen in FIG. 4. This is a metallic cover straddling the thermostat and clamping to it as shown in FIG. 3. It has a flat surface 41 abutting directly against the heated area adjacent sheathed heater 28. In order to transmit the heat directly to the internal sensor 38, the cover is provided with a raised inwardly directed projection 42 that is contiguous with the wall opening of the thermostat 40 and is preferably rectangular as shown to match the rectangular opening in the wall of the thermostat. The projection extends thru the opening like a finger for positioning very closely adjacent the bimetal 38 (actually shown contacting for convenience and emphasis of closeness) when the cover and thermostat are assembled as shown in FIG. 3. This puts the internal sensor 38 almost in conduction contact with the heated casting adjacent heater 28. For best heat conduction, the heating means is provided with a thermostat receiving depressed niche 44 having a flat wall 46 for the thermostat end cover abutment for good heat transfer when the thermostat is nested in the niche.

For ensuring that the thermostat is tightly pressed against the wall 46, a flexible clamp 48 is provided consisting of a shaped spring steel strap 50 that may be secured to an integral boss 52 formed directly as part of the base casting and containing a threaded opening to which the clamp is attached by screw 54 though the flexible clamp. Strap 50 contacts the back of the thermostat 34 in any suitable molded-in locating means such as depression 56 such that the clamp 48 secures and biases the thermostat and base together thus forcing the projection 42 and sensor 38 towards each other for fast thermostat response.

A modification in FIG. 5 uses a cast-in projection 58 in which case the cover 40 may be dispensed with. The general structure is still the same with the thermostat being biased tightly against the casting for fast heat response thru the finger projection.

In order to limit the heat conduction substantially only through the projection, suitable cast-in support ribs 60 may be formed at each end of the niche 44 to limit axial movement or movement in and out of the paper as shown in FIG. 3 and support the thermostat away from the underside 32 of the base. These ribs locate the thermostat axially between the ribs off the base 32 of the casting and force the thermostat directly against the sheathed heater beyond the end of clamp 40 as seen in FIG. 2. In other words, the thermostat is supported so that substantially all of the heat conduction from the casting to the internal bimetal 38 is direct and only through the projection 42 or 58.

The arrangement described thus provides a lower cost plastic thermostat with a modified support to permit very fast reaction time to the thermostat and control of the heated base accordingly.

While I have hereinbefore shown a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

What is claimed is:

1. In a liquid heating electrical appliance having a base with an upper exposed surface and electrical means on the opposite side thereof for heating said surface by conduction, thermostat means in circuit with the heating means for controlling the temperature of said heated surface, the thermostat means being a walled packaged unit with an opening through a wall to an internal sensor and adapted for abutment mounting directly against said heating means, an improvement in said thermostat means mounting comprising, a depressed niche in said heating means adapted to nest the thermostat means therein with said thermostat means being nested in said niche with said opening facing the surface of said heating means, a heat-conducting projection between said depressed niche and thermostat means, said projection extending thru said opening into said thermostat means to be in close heat exchange relation with said sensor, flexible clamp means securing said thermostat means in said niche, said clamp means biasing the projection and sensor toward each other for fast thermostat means response directly between the heating means and sensor for base temperature control, wherein the sensor of the thermostat means comprises an internal heat sensing bimetal and said projection, matching said opening and being disposed closely adjacent said bimetal when the thermostat means is in said niche, said thermostat means including, a metal cover straddling said thermostat means and detachably secured thereto over said opening, a raised projection on said cover extending contiguous with and thru said wall opening closely adjacent the sensor and forming said projection.

2. Apparatus as described in claim 1 wherein said metallic cover is a U-shaped clamp gripping said thermostat means sides for attachment thereto.

3. Apparatus as described in claim 2 wherein said thermostat means wall opening is rectangular exposing said internal heat-sensing bimetal, and said cover projection is rectangular, matching said opening and disposed closely adjacent said bimetal when the cover is in place.

4. Apparatus as described in claim 3 wherein said base is an aluminum casting with a cast-in sheathed circuit heater forming said heating means, said depressed niche being formed in the surface of the cast-in sheathed heater and having a flat-wall for said thermostat means abutment, and an integral boss on said base opposite the niche for attachment of the clamp means to said base.

5. Apparatus as described in claim 4 wherein said niche has cast-in support ribs at each end and said thermostat means is located in said niche axially between the ribs and off the base of the casting, thereby substantially limiting heat conduction only through said projection.

* * * * *